(12) United States Patent
Needham

(10) Patent No.: US 6,803,945 B1
(45) Date of Patent: Oct. 12, 2004

(54) MOTION DETECTING WEB CAMERA SYSTEM

(75) Inventor: Bradford H. Needham, North Plains, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/399,866

(22) Filed: Sep. 21, 1999

(51) Int. Cl.[7] .......................... H04N 5/225; H04N 7/18; H04N 5/232
(52) U.S. Cl. .................. 348/207.1; 348/155; 348/211.3
(58) Field of Search .................................. 348/152, 154, 348/155, 207.1, 207.11, 143, 135, 699, 700, 207.99, 207.2, 211.99, 211.1, 211.3

(56) References Cited

U.S. PATENT DOCUMENTS

| | | | |
|---|---|---|---|
| 4,249,207 A | * | 2/1981 | Harman et al. .............. 348/152 |
| 5,034,811 A | * | 7/1991 | Palm ........................... 358/105 |
| 5,418,548 A | | 5/1995 | Fukushi |
| 5,602,585 A | * | 2/1997 | Dickinson et al. .......... 348/152 |
| 5,635,985 A | | 6/1997 | Boyce et al. |
| 5,673,087 A | | 9/1997 | Choi et al. |
| 5,689,442 A | * | 11/1997 | Swanson et al. ............ 364/550 |
| 5,835,147 A | | 11/1998 | Florentin et al. |
| 5,838,823 A | | 11/1998 | Ancessi |
| 5,946,417 A | | 8/1999 | Bonneau et al. |
| 6,124,893 A | | 9/2000 | Stapleton |
| 6,163,338 A | * | 12/2000 | Johnson et al. ............. 348/143 |
| 6,480,225 B1 | * | 11/2002 | Kim ........................... 348/143 |

* cited by examiner

Primary Examiner—Wendy R. Garber
Assistant Examiner—Justin Misleh
(74) Attorney, Agent, or Firm—Blakely, Sokoloff, Taylor & Zafman LLP

(57) ABSTRACT

A camera system that includes a video camera and a processor, which periodically uploads images captured by the video camera to a web server in accordance with one of a plurality of motion detection algorithms. A first motion detection algorithm captures a current image frame when a pixel comparison between successive image frames exceeds a predetermined threshold.

12 Claims, 3 Drawing Sheets

MOTION DETECTING WEB CAMERA SYSTEM

RELATED APPLICATION

This application is related to application Ser. No. 09/400,792 entitled, "A Web Microphone System", filed Sep. 21, 1999, and application Ser. No. 09/124,179 entitled, "Digital Opaque Projector for Easy Creation and Capture of Presentation Material", filed Jul. 28, 1998, which applications are assigned to the assignee of the present application.

FIELD OF THE INVENTION

The present invention relates generally to the field of video capture; more particularly, to video camera systems having information processing capabilities for uploading pictures to a web server.

BACKGROUND OF THE INVENTION

A web camera (i.e., "webcam") system consists of a video camera plus software that runs on a personal computer to periodically upload an image from the camera to a web page. The basic purpose of a web camera system is to post a reasonably live picture on a user-specified web page. Many webcam systems upload images on a periodic basis; for example, uploading an image once per hour.

FIG. 1 illustrates a web camera system 10, which is typical of the prior art. System 10 includes a video camera 11 that outputs a captured video image to a personal computer (PC) 12. Software running on PC 12 functions to periodically upload the captured video image to an Internet web page (i.e., a web server) shown in FIG. 1 by block 13. Internet service providers (ISPs) commonly provide their patrons with a certain allocation of web page space for personal use. This allows the user to upload images onto their web page periodically; with the frequency of uploading being dependent on the particular type of connection offered by the ISP.

Presently, there are two shareware products in existence that relate to web cameras: Ispy™ and Webcam32™. The Ispy webcam software functions to grab video images, save them as JPEG files, and then send the saved images automatically to a user-specified home page via the connection provided by the users' ISP. Ispy runs under Windows™ 95, Windows 98 and Windows NT 4.0; it also works with any video for Windows-compatible cameras and frame grabbers. Webcam32 is a Windows 95, Windows 98 and Windows NT application that allows video camera images to be displayed within a web page. Like Ispy, Webcam32 software is able to upload images to a web server to allow images to be obtained directly from the page. Both of these products include various simple image-processing features such as captioning of photos, day/time stamping, and text additions.

Webcam32™ software also offers rudimentary motion detection, which is of primary use in security surveillance applications. For example, the Webcam32™ software allows images to be uploaded when, say, 25% of the pixels in the image frame change from one image frame to the next. Although this motion-detecting feature of the software product is useful in limited types of motion detection applications (e.g., security surveillance), it is not useful for different applications. For example, if the web camera system is intended for use in observing and recording wildlife activity, then this type of rudimentary motion detection does not work well.

Another problem with today's webcam systems is the conflict between the desire to minimize the number of times the web camera contacts the ISP and the to capture "interesting" pictures (i.e., those containing certain kinds of motion). Most security surveillance type of web camera systems have a low threshold that results in the taking of many pictures whenever activity is detected. Uploading many pictures onto a web page presents a serious bandwidth problem.

Furthermore, existing products such as Ispy and Webcam32 only provide the ability to capture images on a given schedule, e.g., once per hour, or whenever motion occurs, regardless of how often. If set to capture on a predetermined schedule, images that may be of interest to the user may end up being ignored. On the other hand, if the software is set to upload a video image whenever motion is detected, scenes containing frequent motion can tie up the user's phone lines.

Thus, there is a need for a web camera system that overcomes the problems inherent in the prior art.

SUMMARY OF THE INVENTION

The present invention is a camera system for connection to a web server. The system comprises a video camera and a processor that periodically uploads images captured by the video camera in accordance with one of a plurality of motion detection algorithms. A first motion detection algorithm captures a current image frame when a pixel comparison between successive image frames exceeds a predetermined threshold.

BRIEF DESCRIPTION OF THE DRAWINGS

The present invention will be understood more fully from the detailed description which follows and from the accompanying drawings, which however, should not be taken to limit the invention to the specific embodiments shown, but are for explanation and understanding only.

DETAILED DESCRIPTION

A web camera system that operates in accordance with one of a plurality of motion detection algorithms is described. In the following description, numerous specific details are set forth, such as specific operating modes, procedures, circuit elements, etc., in order to provide a thorough understanding of the invention. It will be obvious, however, to one skilled in the art, that these specific details may not be needed to practice the present invention.

The state-of-the-art of web camera systems is such that there exists a conflict between the desire to minimize the number of times the web camera system dials up the Internet service provider and the desire to capture "interesting" pictures (e.g., those containing certain particular kinds of motion). As previously discussed, existing software products utilized to capture video images permit some rudimentary motion detection. These programs are utilized in applications concerned primarily with uploading images the instant motion is detected. While such programs are suitable for use in applications such as security surveillance systems, they suffer problems when used in different applications, e.g., observation of wildlife activity.

Figure 1:
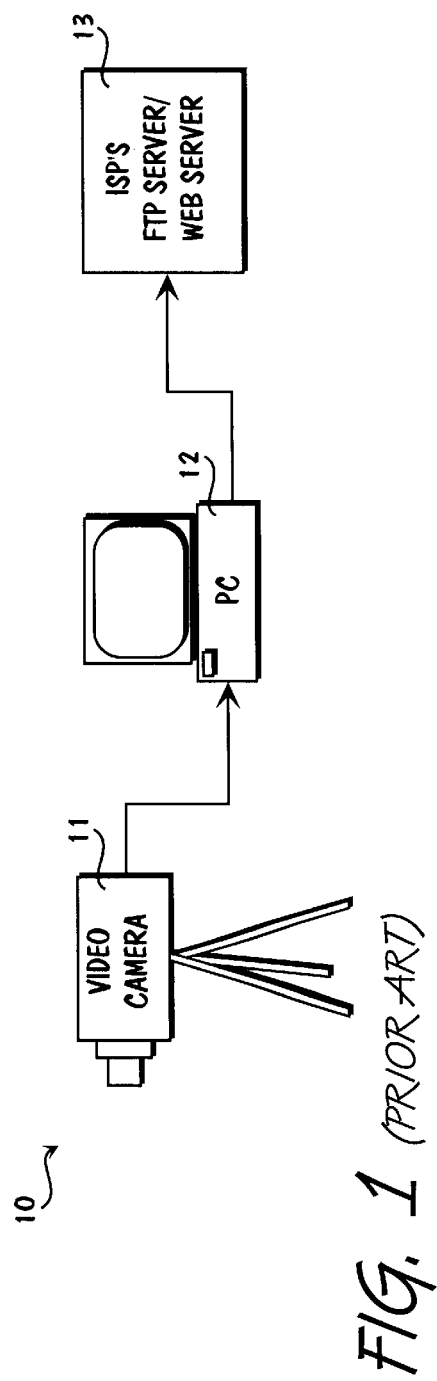
FIG. 1 is diagram of a prior art video capture system.
Figure 2:
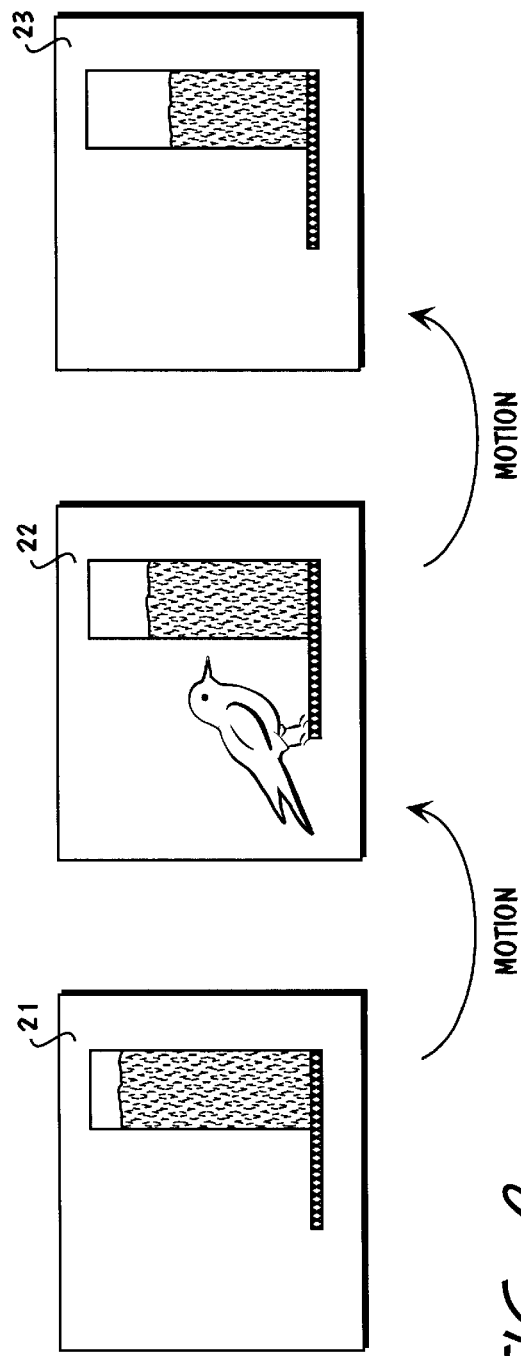
FIG. 2 is an example of an application of one embodiment of the present invention.

FIG. 2 illustrates three image frames 21–23 that may be captured utilizing a web camera system. In this case, the picture of interest is a bird feeding at a bird feeder station. The web camera is directed at the station, and operates to upload captured images either periodically, or in response to detected motion, or both. The problem that exists with prior art web camera systems that periodically upload images, say, every half-hour, is that a bird may arrive and leave many times within that time interval. In the event that a bird is not present at the scheduled image capture time, the only picture that will be captured is one of an empty bird feeder. By way of example, this is the situation represented by image frame 21.

If a motion detecting feature is included in the web camera system, the taking of a picture may be triggered each time movement above a certain threshold is detected. In this case, when the number of pixels between two successive pictures changes (above a predetermined threshold) a new picture is captured and uploaded to the user's specified web site. By way of example, frame 22 of FIG. 2 illustrates the arrival of a bird at the bird feeder, which triggers the video capture of an image frame. Note that many web camera systems in use today typically have low threshold settings that result in the taking of many pictures when the slightest activity is detected. This results in a bandwidth problem for the connection to the Internet service provider.

Another concern relates to movement of the bird when it takes flight to leave the bird feeder station. Existing web camera systems with motion detecting features will trigger on this type of motion. Unfortunately, the last video image captured as a result of this type of motion is an empty bird feeder station, as represented by frame 23. In other words, the most recently captured image for uploading to the user's web site is that of the empty bird feeder, rather than the desired image of wildlife activity.

The present invention helps solve the problem of motion detection and timed update by uploading one image each predetermined interval—selecting the best candidate video image that occurred during any given interval. The camera system includes a video camera coupled to a processor that operates in accordance with one of a plurality of motion detection algorithms to select an image for uploading to the user's web site.

The basic algorithm is as follows. Motion is first detected by performing a pixel comparison between successive image frames. When the pixel comparison between a current image frame and a previous image frame exceeds a predetermined threshold level, software running on the processor saves the current picture as a candidate for uploading. A simple frame grabber technology may be utilized for capture of the video image.

The processor may be programmed to periodically upload the current or last candidate image. For example, a typical web camera system may operate by uploading the last candidate image once every hour. If no motion is detected in the past hour, there are two options: either no uploading of any image, or upload a current image captured by the camera regardless of whether motion is detected.

Figure 3:
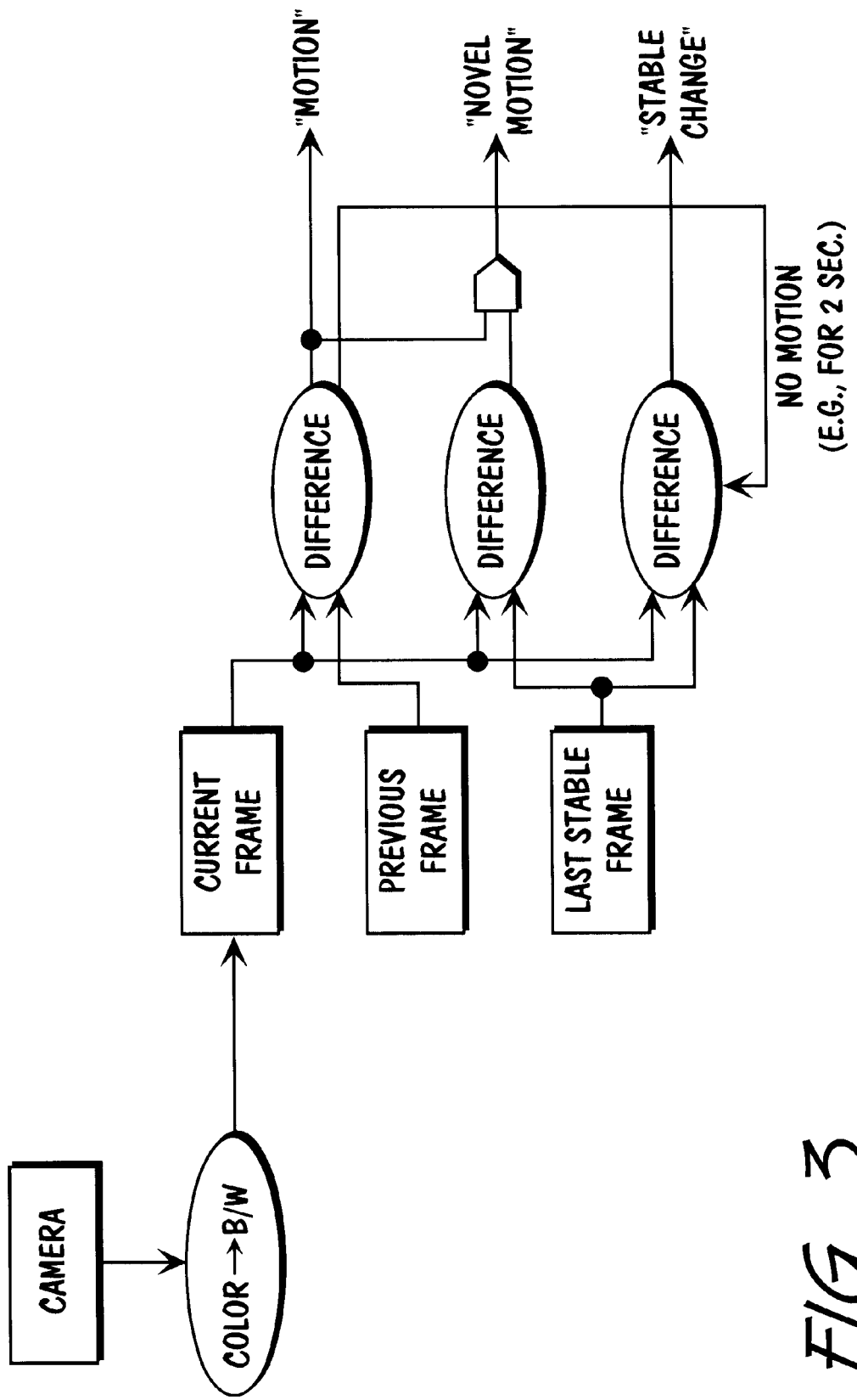
FIG. 3 is a conceptual diagram of various motion-detecting algorithms utilized in accordance with one embodiment of the present invention.

FIG. 3 illustrates a conceptual diagram of various detecting algorithms utilized in accordance with one embodiment of the present invention. Details of this embodiment are provided below and also in the attached Appendix, which contains a code listing of a software program that implements these algorithms.

With reference to FIG. 3, a camera outputs a color image, which is then converted to a black-and-white (B/AW) pixel representation of a current image frame. Three different modes of motion detection are then provided to capture specific types of events. In the basic mode of motion detection, the web camera system selects the most recent image containing motion above a certain threshold. This image represents the candidate image for uploading to the user-specified web server. As previously discussed, the basic mode of motion detection involves a straightforward pixel-by-pixel comparison between a current frame and a previously captured image frame.

A second type of motion detection mode of operation is referred to as "stable-change" detection. The stable-change mode of motion detection is designed to capture persistent changes in a scene, while ignoring relatively simple motions. For example, the stable-change mode of operation is useful in video conferencing applications where the video camera is aimed at a desk or whiteboard where a speaker is placing written subject matter or other objects in front of the camera to facilitate discussion. In such applications, it is useful to capture the notes written on a board, or otherwise presented in front of the camera, while ignoring extraneous motion such as writing on the board, finger pointing, etc.

The stable-change mode of operation is aimed at detecting stable changes to a particular scene and operates in accordance with an algorithm that captures an image frame a certain time period following a last detected motion event. The time duration may be programmable, timed, or fixed depending on what is being viewed and what is to be captured. In the video conferencing application discussed above, software running on the processor operates to capture a video image frame and copy or upload it to remote sites whenever a new writing (or other object for presentation) is placed in front of the video camera. The stable-change mode of operation ignores constant ongoing activity in the field of view.

As can be seen in FIG. 3, the stable-change algorithm compares a current frame against a last stable frame and selects as a candidate picture the last stable frame when no motion has been detected for a certain duration (e.g., two seconds).

The third mode of motion detection operation is referred to in this application as "novel" motion detection. The novel motion detection mode of operation solves the problem that arises in certain applications such as observation of wildlife activity wherein the motion of a bird arriving at a feeder is very similar to the motion of the bird departing from the feeder. A webcam system operating in accordance with only a basic motion detection algorithm—which simply saves the most recent image with motion—cannot distinguish between these two types of events. In other words, the basic motion detection algorithm captures the image of the just vacated bird feeder for uploading to the web server, rather than the picture of the bird that left, simply because it triggers on the last motion detected.

In solving this problem, the novel motion detection algorithm compares an image that contains motion against the most recent stable image, as described above. Images that are not substantially different from the stable image frame are ignored.

FIG. 3 illustrates that novel motion detection involves not only detection of motion, based on a pixel comparison of a current frame against a previous frame, but also a comparison between the current frame and a last stable frame. For example, as applied to the empty bird feeder problem, the last stable frame is that of the recently vacated bird feeder. According to this third algorithm, motion is recorded instead of the absence of motion. That is, the detection of motion, based on a pixel comparison between the current frame and previous frame, triggers capture of a current image frame in a buffer. The buffer may be any one of a variety of buffers, such as a circular buffer, with a capacity to store a sufficient number of image frames.

In this mode, each time motion is detected, the current image is captured into a circular buffer. In other words, in the novel motion detection mode of operation, pictures are captured into a buffer at times other than the last stable framer. The detection of a last stable frame triggers the uploading of an image from the circular buffer that was captured some predetermined time prior to the triggering event. In the bird feeder example, the uploaded image might be an image frame captured several seconds prior to the last detected motion, e.g., an image of the bird prior to leaving.

In one embodiment of the present invention the selected image represents a candidate picture that may be uploaded to a web server at a predetermined interval. Generally speaking, the user may set the interval for uploading the last candidate picture, as well as the particular mode of motion detection to be utilized.

Figure 4:
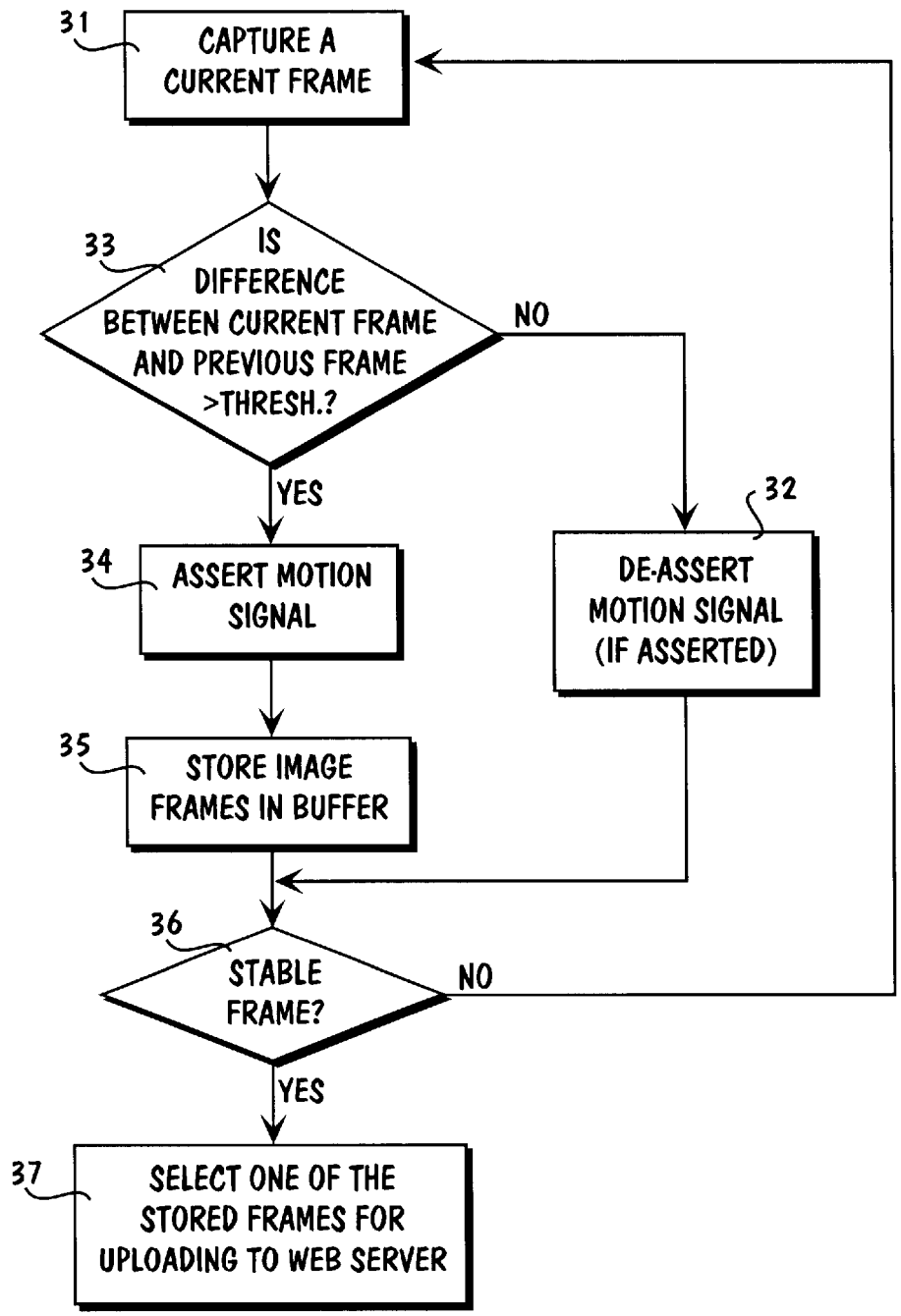
FIG. 4 is a flowchart illustrating one of the motion-detecting algorithms utilized in accordance with one embodiment of the present invention.

FIG. 4 is a flow chart illustrating the novel motion detection algorithm in accordance with one embodiment of the present invention. The flow chart begins at step 31, which indicates the capture of a current image frame by the video camera. If a colored video camera is utilized, the color image may be transformed to a black and white pixel representation. At step 33, a pixel comparison is made between the current frame and a previously captured frame. If the pixel comparison indicates that the number of pixels between the two frames exceeds a predetermined threshold, then the algorithm proceeds to step 34. In step 32, if the predetermined threshold is not exceeded (i.e., no motion indicated) the flow chart returns to step 31.

When basic motion is detected, the pixel comparison causes a motion signal to be asserted by logic circuitry in the processor. This is illustrated in FIG. 4 by step 34. Assertion of the motion signal causes the current image to be loaded into a candidate buffer which holds the most recent images for periodic uploading to a web site.

Both the current image frame and the previous image frame may be held in separate buffers after being captured by the video camera. In this particular mode of operation, a circular buffer may be utilized as a candidate buffer for holding the most recent images captured responsive to the motion signal. The storing of the image frames in the circular buffer is represented in FIG. 4 by step 35.

Step 36 is a determination of whether a stable image frame is detected. If not, the algorithm returns to the beginning step 31. In step 37, on the other hand, if a stable frame is detected, then one of the stored frames is selected for uploading to a web server. The particular frame that may be chosen is the frame that occurred a predetermined time prior to the detection of a stable frame. For example, in the bird feeder example, it is useful to select an image that was captured several seconds prior to the detected motion of the bird leaving the feeder.

I claim:

1. A web camera system for uploading pictures to a web site comprising:
   a video camera;
   a current frame buffer to hold a current image captured by the video camera;
   a previous frame buffer to hold a previous image captured prior to the current image;
   a candidate buffer to hold a most recent image for periodic uploading to the web site;
   logic circuitry to perform a pixel comparison between the current image and the previous image, the logic circuitry asserting a motion signal when the pixel comparison exceeds a predetermined threshold; and
   the web camera system operating according to one of a plurality of modes, in a first mode of operation the current image is loaded into the candidate buffer responsive to the motion signal and in a second mode of operation the current image is loaded into the candidate buffer after a certain duration has elapsed following assertion of the motion signal.

2. The web camera system of claim 1 further comprising:
   a circular buffer to store successive current images when the motion signal is asserted; and wherein
   in a third mode of operation one of the current images stored in the circular buffer is selected for loading into the candidate buffer once the motion signal has been de-asserted for a predetermined time.

3. A method of operating a web camera system comprising:
   capturing a current image frame from a video camera;
   asserting a motion detection signal when a pixel comparison between the current image and a previous image frame exceeds a predetermined threshold;
   storing in a buffer successive image frames captured from the video camera while the motion detection signal is asserted;
   de-asserting the motion detection signal when the predetermined threshold is no longer exceeded for the current image frame;
   selecting from the buffer a certain one of the successive image frames as a candidate picture once the motion detection signal has been de-asserted for a certain duration; and
   uploading the candidate picture to a web site.

4. The method according to claim 3 wherein the buffer is a circular buffer having a capacity to store a plurality of image frames.

5. The method according to claim 3 wherein the uploading step is performed at periodic time intervals.

6. The method according to claim 3 wherein the certain one of the successive image frames is stored a predetermined time before a last image frame is stored in the buffer prior to de-assertion of the motion detection signal.

7. The method according to claim 3 wherein the buffer is a circular buffer having a capacity to store a plurality of image frames.

8. The method according to claim 3 wherein the uploading step is performed at periodic time intervals.

9. The method according to claim 3 wherein the certain one of the successive image frames is stored a predetermined time before a last image frame is stored in the buffer prior to de-assertion of the motion detection signal.

10. A method of operating a web camera system comprising:
    capturing a current image frame from a video camera;
    asserting a motion detection signal when a pixel comparison between the current image and a previous image frame exceeds a predetermined threshold;
    storing in a buffer successive image frames captured from the video camera while the motion detection signal is asserted;

de-asserting the motion detection signal when the predetermined threshold is no longer exceeded for the current image frame;

selecting as a candidate picture either:
- (i) the current image when the motion detection signal is asserted;
- (ii) the current image a first duration following de-assertion of the motion detection signal; or
- (iii) a certain one of the successive image frames from the buffer once the motion detection signal has been de-asserted for a second duration; and uploading the candidate picture to a web site.

11. A computer-readable storage medium having a configuration that represents data and instructions that cause a processor to:

assert a motion detection signal when a pixel comparison between the current image frame captured from a video camera and a previous image frame exceeds a predetermined threshold;

store in a buffer successive image frames captured from the video camera while the motion detection signal is asserted;

de-assert the motion detection signal when the predetermined threshold is no longer exceeded for the current image frame;

select from the buffer a certain one of the successive image frames as a candidate picture once the motion detection signal has been de-asserted for a certain duration; and upload the candidate picture to a web site.

12. The computer-readable storage medium of claim 11 wherein the medium is further configured to cause the processor to:

select as a candidate picture either:

the current image when the motion detection signal is asserted;

the current image a first duration following de-assertion of the motion detection signal; or a certain one of the successive image frames from the buffer once the motion detection signal has been de-asserted for a second duration.

* * * * *

UNITED STATES PATENT AND TRADEMARK OFFICE
CERTIFICATE OF CORRECTION

PATENT NO.    : 6,803,945 B1  
DATED         : October 12, 2004  
INVENTOR(S)   : Needham It is certified that error appears in the above-identified patent and that said Letters Patent is hereby corrected as shown below:

Column 2,  
Line 1, after the third occurrence of "the", insert -- need --.  
Line 35, before "diagram", insert -- a --.

Column 3,  
Line 67, delete "B/AW" and insert -- B/W --.

Column 5,  
Line 11, delete "framer" and insert -- frame --.

Signed and Sealed this

Twenty-fifth Day of January, 2005

JON W. DUDAS  
*Director of the United States Patent and Trademark Office*